(12) United States Patent
Adams et al.

(10) Patent No.: US 7,742,473 B2
(45) Date of Patent: Jun. 22, 2010

(54) ACCELERATOR MODULE

(76) Inventors: Mark Adams, 2132 Baxter St., Los Angeles, CA (US) 90039; William R. Babbitt, Jr., 22350 Gavilan Rd., Perris, CA (US) 92570; Rochak Sharma, 2103 Ladrillo Aisle, Irvine, CA (US) 92606

( * ) Notice: Subject to any disclaimer, the term of this patent is extended or adjusted under 35 U.S.C. 154(b) by 698 days.

(21) Appl. No.: 11/304,304

(22) Filed: Dec. 14, 2005

(65) Prior Publication Data

US 2006/0098653 A1 May 11, 2006

Related U.S. Application Data

(63) Continuation-in-part of application No. 10/473,713, filed as application No. PCT/US02/40205 on Dec. 16, 2002, now Pat. No. 7,602,773.

(60) Provisional application No. 60/640,764, filed on Dec. 29, 2004, provisional application No. 60/425,867, filed on Nov. 12, 2002.

(51) Int. Cl.
*H04L 12/28* (2006.01)
*H04J 3/16* (2006.01)

(52) U.S. Cl. .................... 370/389; 370/469

(58) Field of Classification Search ............ 370/389, 370/394, 400, 401, 465, 466, 469
See application file for complete search history.

(56) References Cited

U.S. PATENT DOCUMENTS

| | | | |
|---|---|---|---|
| 5,634,111 A | 5/1997 | Oeda et al. | |
| 5,742,604 A | 4/1998 | Edsall | |
| 5,867,686 A | 2/1999 | Conner et al. | |
| 5,937,169 A | 8/1999 | Connery et al. | |
| 5,983,024 A | 11/1999 | Fye | |
| 6,018,779 A | 1/2000 | Blumenau | |
| 6,105,122 A | 8/2000 | Muller et al. | |
| 6,157,955 A | 12/2000 | Narad et al. | |
| 6,202,060 B1 | 3/2001 | Tran | |
| 6,246,683 B1 | 6/2001 | Connery et al. | |
| 6,253,273 B1 | 6/2001 | Blumenau | |
| 6,288,716 B1 | 9/2001 | Humpleman et al. | |
| 6,434,683 B1 | 8/2002 | West et al. | |
| 6,480,934 B1 | 11/2002 | Hino et al. | |
| 6,549,983 B1 | 4/2003 | Han et al. | |
| 6,601,101 B1 | 7/2003 | Lee et al. | |
| 6,618,743 B1 * | 9/2003 | Bennett | 718/104 |
| 6,629,264 B1 | 9/2003 | Sicola et al. | |

(Continued)

OTHER PUBLICATIONS

Non-Final Office Action dated Jan. 23, 2009 for U.S. Appl. No. 11/242,985.

(Continued)

*Primary Examiner*—Hong Cho
(74) *Attorney, Agent, or Firm*—Schwabe, Williamson & Wyatt, P.C.

(57) ABSTRACT

Stateless storage accelerator modules comprise network interfaces and filter functions that enable the accelerated processing of stateless protocols associated with network storage. Filter functions examine packets received over the network interface according to contexts associated with the destination of the packets. Contexts are found quickly through a fast look-up to ensure high performance of the over all system. The contexts comprise information associated with storage areas including addresses associated with the storage areas.

33 Claims, 5 Drawing Sheets

U.S. PATENT DOCUMENTS

| | | | |
|---|---|---|---|
| 6,681,244 | B1 | 1/2004 | Cross et al. |
| 6,693,912 | B1 | 2/2004 | Wang |
| 6,701,432 | B1 | 3/2004 | Deng et al. |
| 6,754,662 | B1 | 6/2004 | Li |
| 6,757,845 | B2 * | 6/2004 | Bruce .................. 714/32 |
| 6,799,244 | B2 | 9/2004 | Blumenau et al. |
| 6,834,326 | B1 | 12/2004 | Wang et al. |
| 6,862,606 | B1 | 3/2005 | Major et al. |
| 6,876,657 | B1 | 4/2005 | Brewer et al. |
| 6,895,461 | B1 | 5/2005 | Thompson |
| 6,907,473 | B2 | 6/2005 | Schmidt et al. |
| 6,917,616 | B1 | 7/2005 | Normand et al. |
| 6,947,430 | B2 | 9/2005 | Bilic et al. |
| 7,120,666 | B2 | 10/2006 | McCanne et al. |
| 7,152,069 | B1 | 12/2006 | Santry et al. |
| 7,188,194 | B1 | 3/2007 | Kuik et al. |
| 7,206,805 | B1 * | 4/2007 | McLaughlin, Jr. ......... 709/203 |
| 7,237,036 | B2 * | 6/2007 | Boucher et al. ............ 709/245 |
| 7,353,266 | B2 * | 4/2008 | Bracewell et al. .......... 709/223 |
| 2001/0026550 | A1 | 10/2001 | Kobayashi |
| 2001/0037371 | A1 | 11/2001 | Ohran |
| 2001/0049739 | A1 | 12/2001 | Wakayama et al. |
| 2002/0052962 | A1 * | 5/2002 | Cherkasova et al. ........ 709/229 |
| 2002/0065875 | A1 * | 5/2002 | Bracewell et al. .......... 709/203 |
| 2003/0026246 | A1 | 2/2003 | Huang et al. |
| 2003/0069995 | A1 * | 4/2003 | Fayette .................. 709/249 |
| 2003/0093567 | A1 | 5/2003 | Lolayekar et al. |
| 2003/0118053 | A1 | 6/2003 | Edsall et al. |
| 2003/0202510 | A1 | 10/2003 | Witkowski et al. |
| 2004/0047367 | A1 | 3/2004 | Mammen |
| 2004/0100952 | A1 * | 5/2004 | Boucher et al. ............ 370/389 |
| 2005/0033740 | A1 | 2/2005 | Cao et al. |
| 2005/0175005 | A1 | 8/2005 | Brown |
| 2006/0176903 | A1 | 8/2006 | Coulier |

OTHER PUBLICATIONS

Final Office Action dated Nov. 13, 2008 for U.S. Appl. No. 11/242,985.
Non-Final Office Action dated Jun. 16, 2008 for U.S. Appl. No. 11/242,985.
Non-Final Office Acton dated Nov. 28, 2008 for U.S. Appl. No. 11/344,874.
Non-Final Office Action dated Oct. 31, 2008 for U.S. Appl. No. 11/305,679.
Final Office Action dated Mar. 26, 2009 for U.S. Appl. No. 11/305,679.
Non-Final Office Action dated Jan. 10, 2007 for U.S. Appl. No. 10/763,099.
Final Office Action dated Jul. 16, 2007 for U.S. Appl. No. 10/763,099.
Ki-Il Kim; Jeoung-Lak Ha; Eun-Hee Hyun; Sang-Ha Kim, "Internet multicast provisioning issues for hierarchical architecture," Networks, 2001. Proceedings. Ninth IEEE.
International Conference on, vol., no. pp. 401-404, Oct. 10-12, 2001.
B. Quinn et al. IP Multicast Applications: Challenges and Solutions. Sep. 2001. Network Working Group. RFC 3170.
International Search Report and Written Opinion of International Searching Authority for PCT/US05/01542 mailed Aug. 25, 2008 (13 pages).
International Preliminary Examinational Report for PCT/US02/40205 dated Nov. 12, 2004.
Thomas E. Anderson et al, "Serverless Network File Systems", Computer Science Division, Cal Berkeley, (34 pages).
Non-final OA dated Jan. 7, 2008 for U.S. Appl. No. 10/763,099.
Final OA dated Jul. 8, 2008 for U.S. Appl. No. 10/763,099.
Non-final OA dated Nov. 26, 2008 for U.S. Appl. No. 10/763,099.
Final OA dated Oct. 9, 2008 for U.S. Appl. No. 10/473,713.
Office Action dated Jan. 26, 2007 for Chinese app. No. 02829873.X.
Response to OA dated Oct. 31, 2008 for U.S. Appl. No. 11/305,679.
Notice of Allowance dated Jun. 3, 2009 for U.S. Appl. No. 10/473,713.
Non-final OA dated Apr. 28, 2009 for U.S. Appl. No. 11/243,116.
Final OA dated Sep. 4, 2009 for U.S. Appl. No. 11/242,985.
Notice of Allowance dated Sep. 4, 2009 for U.S. Appl. No. 11/305,679.
Final OA dated Jun. 4, 2009 for U.S. Appl. No. 10/763,099.
Office Action dated Jul. 27, 2007 for Chinese App. No. 02829873.X.
Official Action dated Aug. 9, 2005 (mailing date Aug. 16, 2005) for Japanese App. No. 2004-551383.
Official Action dated Jan. 6, 2006 (mailing date Jan. 17, 2006) for Japanese App. No. 2004-551383.
Final Rejection dated May 12, 2006 (mailed May 23, 2006) for Japanese app. No. 2004-551383.
Office Action/Objection dated Sep. 23, 2008 for EP App. No. 06 016 115.5.
Office Action/Communication dated Jun. 1, 2007 for EP App. No. 06 016 115.5.
Notice of Allowance dated Jan. 29, 2009 for U.S. Appl. No. 10/791,338.
Lin JC and Paul S, "Rmtp: a reliable multicast transport protocol," Proceedings of IEEE INFOCOM '96, vol. 3, pp. 1414-24, 1996.
Non-final OA dated Dec. 10, 2007 for U.S. Appl. No. 10/473,713.
Non-final OA dated Apr. 28, 2008 for U.S. Appl. No. 10/473,713.

* cited by examiner

ACCELERATOR MODULE

This application claims the benefit of U.S. provisional application Ser. No. 60/640,764 filed Dec. 29, 2004 and this application is a continuation-in-part of co-owned U.S. patent application Ser. No. 10/473,713 filed Mar. 3, 2004 which is the national stage of international application number PCT/US02/40205 filed on Dec. 16, 2002; which claims priority to provisional application No. 60/425,867 filed on Nov. 12, 2002.

FIELD OF THE INVENTION

The field of the invention is network storage protocol acceleration modules.

BACKGROUND OF THE INVENTION

Network storage standards including iSCSI impose significant communication overhead to realize the promise of high performance network storage. The response to the communication overhead is a class of products that focus on the acceleration of processing communication stateful protocols. For example, companies including Alacritech® develop TCP Offload Engines (TOE) that accelerate the processing of packets associated with network storage by assigning TCP datagram processing responsibilities to an additional TOE module. The TOE modules track stateful connections between applications, users, operating, or other host functions and a network storage device.

Although TOEs are well know, the trend in the network storage industry is to further increase network performance by producing faster accelerator modules as is evidenced by the success of companies including Alacritech. Customers that desire high performance network storage are required to pay additional charges for equipment to process stateful protocols faster. The overhead or the cost of offloading stateful protocol processing will be exacerbated as industry migrates to faster networking infrastructure including Gigabit Ethernet (1000 Mbit), 10 Gigabit Ethernet (10 Gbit), or other forms of high speed communications relying on stateful connections.

The trend in network storage continues to focus on using TCP, a stateful protocol, to transport network storage information. TCP is used largely because of its reliability for transferring data across established connections. In addition, standardized stateful storage protocols including iSCSI require TCP. Unfortunately, the cost of ensuring reliability becomes quite high at higher line rates as mentioned previously which creates more demand for stateful offload engines.

Companies including Zetera™ are moving to stateless protocols to enhance performance without requiring stateful management of connections. Storage network protocols riding on UDP are ideally suited to the block oriented, stateless nature of storage devices. Using stateless protocols improves the connectivity of devices and increases performance due to the lower overhead of protocol stack processing. In general, only the payload and destination information is required when processing stateless network storage packets. For example, a storage device that receives a block-read request does not require information about previous commands, subsequent commands, or other information to conduct the actual read. This allows multiple clients to make many requests simultaneously of the storage device without interfering with each other. The storage device simply performs the read and responds back to the client.

Although stateless protocols out perform stateful protocols for network storage, protocol stacks still incur overhead when processing the stateless protocols. Therefore, it is contemplated that as networking infrastructure continues to improve the number of stateless protocol packets that require processing will increase dramatically thus incurring the overhead cost of packet processing similar to what has occurred with TCP at lower line rates. Therefore, it is expected that stateless accelerator modules (SAM) could aid in processing storage protocols that utilize a stateless protocol.

The following patents attempt to address the need for accelerating packet processing:

U.S. Pat. No. 5,937,169 titled "Offload of TCP segmentation to a smart adapter" assigned to 3Com Corporation.

U.S. Pat. No. 6,157,955 titled "Packet processing system including a policy engine having a classification unit" assigned to Intel Corporation.

U.S. Pat. No. 6,246,683 titled "Receive processing with network protocol bypass" assigned to 3Com Corporation.

U.S. Pat. No. 6,601,101 titled "Transparent access to network attached devices" assigned to 3Com Corporation.

U.S. Pat. No. 6,947,430 titled "Network adapter with embedded deep packet processing"

These patents collectively teach offloading protocol processing for stateful processing and in some cases handling transport layer processing for storage devices. The stateful processing includes handling for flow control, for application specific information, or specifically for TCP state information. Because the trend in the market is to address stateful protocols including TCP or iSCSI, none of the related art addresses offloading stateless protocols used for network storage utilizing destination contexts.

Therefore, there remains a considerable need for apparatus and methods to accelerate stateless protocol processing for network storage as stateless protocols subtend larger market share or as high bandwidth networks are deployed. To fully realize the benefits of a SAM, a solution would require the following elements:

A network interface that receives or transmits stateless protocol packets over a network A host interface the exchanges packets with the host Accelerates packet processing by passing packets through a filter function that determines the disposition of packets based on stored contexts relating to the destination of the packets SAMs address the need for stateless protocol offloading differently than modules that handle stateful protocol processing. Stateful protocol processing modules are forced to handle session information as well as state information which limit the extent of the offloading. For example, a TOE can handle routine processing including flow control, sequence numbers, or acknowledgement numbers, but can not handle complex situations where a full TCP/IP stack is required including session construction. Therefore, modules similar to TOEs incur additional overhead to determine which packets are fast-path packets and which packets are slow-path packets when interacting with a network storage device. However, SAMs require no session construction, no state information, no retransmit logic, or no window probes. Rather SAMs use the context of the destination to aid in the elimination of the communication stack overhead; consequently, substantially all network storage device packets are fast-path packets.

SUMMARY OF THE INVENTION

The present inventive subject matter relates to modules that accelerate processing of network storage packets. Accelerator modules comprise network interfaces, programmed instructions, contexts associated with the destination of the packets, or a host interface. Network interfaces receive packets associated with network storage wherein the packets could comprise a stateless protocol. The instructions located within a memory system associated with the modules accelerate the processing of the packets by passing the packets through a filter function. Each of the packets is addressed to a destination. Contexts describing the characteristics of the destination are used to aid in the acceleration of the processing. A host exchanges data or packets with the module through the host interface.

Methods associated with the inventive subject matter include accelerating the processing of a stateless protocol used for network storage by passing the packets through a filter function. The methods include receiving packets through a network interface where the packets comprise the stateless protocol. The packets bypass at least part of a communication stack (i.e. a UDP/IP networking stack) to reduced packet processing times. In addition, packets pass through a filter function that operates on the packets providing capabilities including eliminating unwanted packets or directing packets to a final destination. The filter function finds context information associated with the destination of the packets to aid in the filtering operations.

GLOSSARY

The following descriptions refer to terms used within this document. The terms are provided to ensure clarity when discussing the various aspects of the inventive subject matter without implied limitations.

The term "context" herein means information relating to an end-point of a communication link. A context is not a connection point as in the concept of TCP where a connection is represented by a persistent set of IP address and port pairs. A context can comprise a network address, or even a port assignment; however, the information is localized to only one end of the communication link. Furthermore, a context can also include additional information relating to the final destination of a communications link. For example, if the final destination comprises a network addressable storage partition, the partition's context could include partition address, partition size, authentication data, data transfer size, stripe block size, partition name, pointers to a datagram comprising a storage protocol message, file locks, or other information relating to the partition. A SAM uses the context information to determine the final disposition of a packet.

The term "filter function" herein means one or more actions performed by a SAM to accelerate processing network storage packets through deciding how the packets should be handled or directed. Contemplated actions include bypassing a portion of a communication stack, discarding packets, passing messages to an application, or other actions that result in faster network storage packet processing by a system that employs a SAM. A filter function is not simply processing the packets faster, but rather employing rules for packet handling.

The term "module" herein means any one or combination of hardware, software, or firmware to perform a set of functions. In the case of a SAM, the module substantially processes, pre-empts processing, or filters stateless protocol information to accelerate the passage of network storage data from the network to the OS, file system, application, or other interested entity. In a preferred embodiment, a SAM is a software or firmware module running on a client using network storage or a server providing access to network storage. In a yet more preferred embodiment, it is contemplated that a SAM could advantageously be implemented as a single hardware module performing the functions. Example hardware modules include ASICs, FPGAs, adapter boards with their own firmware, or other hardware systems, possibly combined with firmware, that perform the stateless protocol acceleration.

The term "stateless protocol" herein means a protocol that does not carry history from one packet or message to the next. For example, TCP is not stateless because the protocol must manage connection oriented information including sequence numbers, acknowledgement numbers, or TCP state (ESTABLISHED state, LISTEN state, etc . . . ) to keep a connection between two hosts alive. Examples of stateless protocols include HTTP, UDP, Ethernet, IP, or other protocols where connection information does not necessarily have to be managed. Furthermore, the concept where one end of a communication link does not require state information falls within the concept of "stateless." Therefore, reliable UDP could be considered stateless if a first host tracks connection information while communicating with a second host that does not track connection information. From the perspective of the second host, the protocol is stateless. In addition, a stateless protocol could be transported over a TCP connection, HTTP for example. Other stateless protocols include internetworking protocols comprising IPv4, IPv6, or IPX.

The teachings herein may be advantageously employed by developers of network storage devices, devices that use network storage, or software that interacts with network storage. SAMs can be employed to enhance the performance of network storage. SAMs can advantageously apply to clients as well as servers. In addition SAMs can be self contained units that integrate directly into larger products, for example, interface cards, hardware modules, integrated circuit chips, field programmable logic arrays (FPGAs), application specific integrated circuits (ASICs) or other modular devices.

Various objects, features, aspects, and advantages of the present invention will become more apparent from the following detailed description of the preferred embodiments of the invention, along with the accompanying drawings in which like numerals represent like components.

DETAILED DESCRIPTION

SAM Environment

Figure 1:
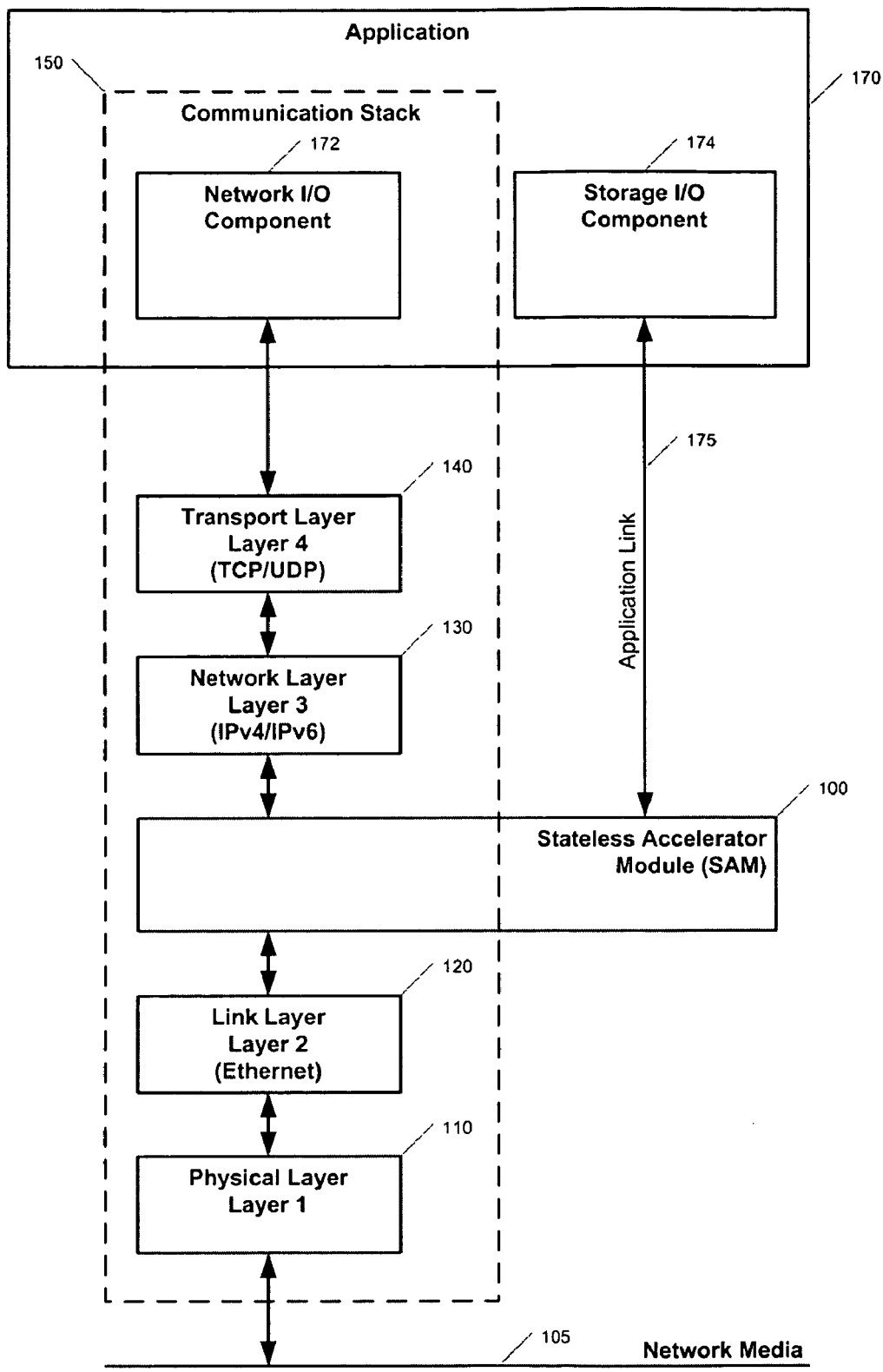
FIG. 1 represents how a stateless accelerator module interacts within an environment comprising a communication stack and application.

FIG. 1 displays a possible embodiment where a SAM could reside within a communication stack and application environment. In a preferred embodiment, application 170 comprises a network storage server that provides access to storage resources through storage I/O component 174. Application 170 could optionally include network I/O component 172 that handles network communications in a traditional manner. Application 170 utilizes communication stack 150 to send network messages over media 105. Communication stack 150 could adhere to the OSI layered networking model comprising an application layer (not shown), a session layer (not shown), a presentation layer (not shown), transport layer 140, network layer 130, link layer 120, or physical layer 110. It is contemplated that network I/O component 172 comprises the application layer, the session layer, or the presentation layer, possibly utilizing a BSD socket interface. SAM 100 interfaces between two layers of communication stack 150 to filter packets appropriately for application 170.

Application

Application 170 exists at the top of the communication stack and provides a desired set of functionality. Application 170 sends messages over network media 105 through the use of communication stack 150 to communicate with other networked entities. It is contemplated that application 170 uses communication stack 150 for sending or receiving messages based on a plurality of standardized protocols including HTTP, SNMP, FTP, TFTP, Telnet or other useful protocols. In addition, it is contemplated that application 170 utilizes a storage protocol to exchange network storage messages with remote networked hosts. Application 170 could function as a client or a server of network storage.

In a preferred embodiment, application 170 represents a network storage server managing storage resources. Example of a network storage server includes a SAN, NAS, or other servers that provide access to the storage resources. In the preferred embodiment, application 170 comprises a plurality of firmware modules operating on an operating system including drivers that provide access from application 170 to the storage resources. Examples of storage resources include hard disk drives; however, other storage resources could also be employed including flash, RAM, optical media, tape, or other data storage media. As application 170 interacts with remote clients, SAM 100 intercepts packets from the remote clients and bypasses the upper portions of communication stack 150 to ensure application 170 receives storage protocol messages as fast as possible.

SAM 100 sends or receives storage protocol messages through application link 175 as it communicates with storage I/O component 174. Storage I/O component 174 represents the parts of application 170 responsible for handling of the storage protocol. As storage I/O component 174 receives messages from SAM 100, preferably component 174 can act on them with out further interpretation. Therefore, if the message indicates a write command, the data can be written directly to disk. If the message indicates a read command, data can be read directly from the disk and then the data is presented back to SAM 100 as a fast-path out of the server.

In a preferred embodiment, application 170 supplies SAM 100 with context information regarding the possible destinations of storage protocol messages. SAM 100 uses the context information to bypass communication stack 150 and allows for direct application level communication.

Although a preferred embodiment application 170 provides server functionality, it is contemplated that application 170 could also be a client side application. Examples of client side applications include file systems, operating systems, databases, or other client applications that use network storage.

Storage Protocol

Application 170 uses a storage protocol to communicate with remote hosts transported over standardized networking protocols including TCP, UDP, IP, or other protocols. In a preferred embodiment, the storage protocol is transported over UDP as opposed to TCP to reduce overhead associated with managing a stateful connection. A single UDP destination port can be used when communicating with a server because there is no need to differentiate block level request entities on the link. Multiple entities can send messages at the same time to the same storage destination because the storage device is contemplated to be stateless. Additionally other stateless protocols are contemplated to carry the storage protocol, including HTTP. Preferably, the storage protocol itself is a stateless block oriented protocol. In addition, in an especially preferred embodiment the storage protocol comprises atomic commands where a single message comprises all the information needed by component 174 to execute the command. Atomic commands lend themselves to UDP transport because a single datagram can easily represent a single command. Therefore, it is contemplated the storage protocol messages are datagrams that are packetized then sent over network media 105.

It is contemplated that each message in the storage protocol is addressed to a specific destination. In preferred embodiment, application 170 is able to support multiple destinations simultaneously. For example, when application 170 operates as a network storage server, application 170 supports multiple storage areas on one or more disk drives where each storage area is network addressable. As component 174 receives messages from SAM 100, component 174 determines with which partition to communicate from the address within the message. In an especially preferred embodiment, the target address comprises a routable address, preferably an IP address, of the target partition.

A storage protocol comprises a number of different commands used to interact with storage resources. Contemplated commands include write to the storage resource, read from the storage resource, create a storage area, destroy a storage area, check status, or additional commands that relate to a storage resource. An example of a preferred storage protocol includes a protocol developed by Zetera Corporation, an Irvine, Calif., company (see Zetera U.S. patent application Ser. Nos. 10/473,713 and 10/791,338).

Communication Stack

Communication stack 150 provides access from application 170 to network media 105. It is contemplated communication stack 150 employs a typical TCP/IP networking stack as included with many commercial operating systems or with commercially available embedded TCP/IP stacks. Typical TCP/IP networking stacks include many standardized protocols including TCP, UDP, IP, ICMP, SNMP, or other protocols.

It is contemplated communication stack 150 includes numerous data structures, functions, or other operations necessary to handle general purpose communications across the large number of possible protocols. In a preferred embodiment, where stateless protocols are used, most of the support for the general purpose communications is unnecessary when exchanging storage protocol messages. Therefore, SAM 100 processes at least a portion, or at least bypasses a portion, of communication stack 150 responsibility by employing a filter function.

SAM Responsibilities

SAM 100 inserts between layers of communication stack 150 to intercept network packets. As SAM 100 receives packets, either from the host side of communication stack 150 or network side of communication stack 150, it attempts to accelerate the processing of the packets by offloading work from communication stack 150 or by bypassing communication stack 150. Therefore, packets processing is accelerated by passing the packets through a filter function.

In a preferred embodiment, SAM 100 interfaces between network layer 130 and link layer 120 to monitor packets traveling through communication stack 150. Placing SAM 100 in this location is advantageous for storage protocols because the packets have entered the system, but have not yet passed through network level processing that could include routing or fragmentation/reassembly, and have not yet passed through the transport layer level processing. In an especially preferred embodiment, SAM 100 provides accelerated processing of received packets whose final destination is within application 170.

SAM 100 uses context information that describes the characteristics of possible destinations for packets to aid in the acceleration process. In a preferred embodiment, as packets are received by SAM 100, it consults a collection of destination contexts to determine where a packet is to be delivered, if a packet is to be aggregated into a full storage protocol message, if a packet is discarded, or if a packet is passed on to the communication stack. In an especially preferred embodiment, SAM 100 uses packet header information including an IP address or packet payload information in the analysis of the packet.

It is contemplated that SAM 100 provides a zero copy data transfer to or from communication stack 150 or application 170. The term "zero copy" means once the packets enter the system, the data within the packet is not copied from one memory location to another. This greatly increases the speed of processing. In a preferred embodiment, the packets or their payloads are managed through one or more pointers to the headers or to the payloads as opposed to passing substantial portions of the packets among the various parts of the system.

Beyond operating to accelerate receiving packets in a server application, it is contemplated SAM 100 can also operate in a client environment or in an environment where transmits can be accelerated. In a client environment, SAM 100 could accelerate processing between communication stack 150 and a file system operating as application 170 where the file system makes requests from a network storage server. In addition, SAM 100 also accelerates transmits through the use of destination contexts. As messages are received or processed by application 170 then application 170 responds to the messages if applicable, application 170 presents a response to SAM 100 which then uses context information to create headers quickly for a return message. SAM 100 presents the final packet to link layer 120. Because stateless protocols are used, there is no need for managing header information for long term storage.

Stateless Accelerator Modules

Figure 2:
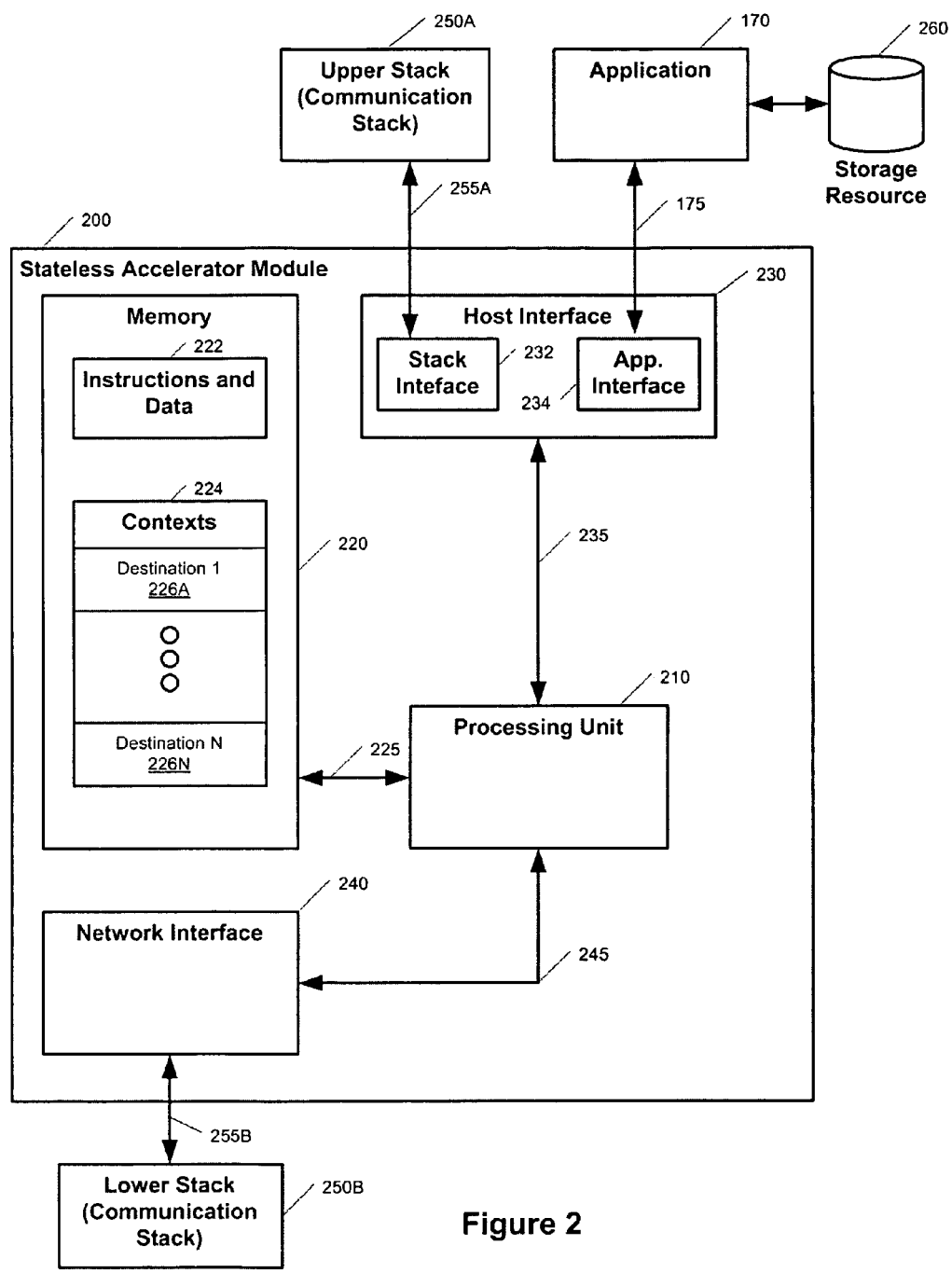
FIG. 2 represents a possible embodiment of a stateless accelerator module.

FIG. 2 depicts a logical view of a possible embodiment of a SAM. SAM 200 comprises processing unit 210, memory 220, host interface 230, or network interface 240. Memory 220 includes instructions and data 222 associated with the filtering functionality of SAM 200. Processing unit 210 accesses memory 220 through communication link 225 to obtain instructions and data 222. As packets pass through SAM 200, processing unit 210 exchanges packet information with network interface 240 over link 245 and with host interface 230 over link 235. Processing unit 210 processes the packets by consulting contexts 224 stored in memory 220. Contexts 224 comprise one or more destination contexts 226A through 226N. Destination contexts 226A through 226N comprise sufficient information regarding possible destinations for storage protocol messages that processing unit 210 can use the information to accelerate the processing of the messages relative to passing the messages through a traditional communication stack. Network interface 240 provides SAM 200 with an interface to lower stack 250B (the lower portion of communication stack 150) via stack link 255B. Host interface 230 provides SAM 200 access to upper stack 250A (the upper portion of communication stack 150) and to application 170 over application link 175. Host interface 230 comprises stack interface 232 or application interface 234. Stack interface 232 interacts with upper stack 250A when non-storage protocol messages are passed through SAM 200 via stack link 255A. In a preferred embodiment, APIs represent stack links 255A or 255B wherein the APIs link the communication stack modules or functions; however, other stack links are also contemplated include the use of shared memory. Application 170 interacts with storage resource 260 based on the storage protocol messages received through application interface 234. Links 235 and 245 are logical connections to the interfaces 230 and 240, respectively, and in a preferred embodiment links 235 and 245 are APIs.

Memory 220 stores instructions and data 222 along with contexts 224 for use SAM 200. When SAM 200 operates within a computer system, memory 220 comprises the computer's RAM, flash, hard disk drive, or other data storage media accessible by the computer. When SAM 200 operates in an embedded system it is contemplated that memory 220 includes flash, or RAM. Similarly, processing unit 210 could be a computer's main CPU used to run application 170 or could be an embedded processor. It is also contemplated that SAM 200 could be a self contained unit with memory 220 and processing unit 210 dedicated solely to SAM 200. In a preferred embodiment, SAM 200 operates within a network storage server and stores instructions and data 222 in non-volatile storage and processing unit 210 is shared with application 170. Furthermore, when processing unit 210 is a low cost embedded processor shared with application 170, SAM 200 greatly enhances performance of the system because processing unit 210 does not have to handle full communication stack processing for all packets. For example, SAM 200 could comprise only firmware that provides a communication stack bypass as the filter function. Communication link 225 provides access to contexts 224. In a preferred embodiment, communication link 225 comprises a bus that provides processing unit 210 access to contexts 224 stored in memory 220. In alternative embodiments, contexts 224 could be stored in a memory external to SAM 200 in which case communication link 225 takes on other forms in addition to a bus. Additional contemplated forms for communication link 225 included wire links, wireless links, APIs, or other mechanisms providing access to contexts 224. Examples of wired links include programmable I/O pins, connectors, Ethernet, USB, Firewire, or other physical connections. Examples for wireless links include IrDA, 802.11, WiFi, WiMAX, Bluetooth, or other non-physical connections. An API provides connections between SAM 200 and external entities to SAM 200. It is contemplated that either the external entities or SAM 200 could call the APIs to result in SAM 200 having access to contexts 224.

Network interface 240 provides SAM 200 access to lower stack 250B. It is contemplated that network 240 could include a number of embodiments. For example, if network interface 240 comprised hardware, it could include a PCI bus interface, programmable I/O pins, wireless interface, or others physical interfaces. In addition, in a preferred embodiment, network interface 240 comprises an API that directly links lower stack 250B which represents a link layer of a communication stack. Network interface 240 could also include an inter-process communication in the circumstances when SAM 200 operates as a task or thread within an operating system. Furthermore, in especially preferred SAM embodiments employ RDMA to accelerate passing network storage packets over network interface 240 to accelerate passing network packets over a network.

SAM 200 receives packets to be analyzed from network interface 240. It is contemplated that storage protocol messages comprise one or more packets. Therefore, SAM 200 collects packets when necessary to form a storage protocol message. Once a message is complete, the storage protocol message is passed through application interface 234 to be passed to application 170. Alternatively, if the packets are not part of the storage protocol they are either passed to upper stack 250A or discarded. SAM 200 determines the final disposition of the packets as a function of contexts 224.

Stack interface 232 provides SAM 200 access to upper stack 250A. Stack interface 232 could also include hardware or software interfaces to upper stack 250A. In a preferred embodiment, stack interface 232 comprises an API that interfaces directly to upper stack 250A which could comprise a transport layer for a communication stack. Furthermore, in a preferred embodiment application interface 234 also comprises an API for application 170.

In other embodiments, it is contemplated that SAM 200 comprises a security module (not shown) to aid in the acceleration of protocol processing. The security module aides in the encryption or decryption of storage protocol messages, authentication, or checking integrity of packets or messages. Contemplated security modules include those that support FIPS 140-2, AES, DES, 3DEC, SHA-1, MD5, MD4; ECC, or other cipher suites or other security standards.

In some embodiments, SAM 200 is a software or firmware module in a network storage server. In such embodiments, SAM 200 is able to operate as a driver. For example, in a computer system running Windows®, SAM 200 is advantageously deployed as a kernel level driver operating between a file system and a TCP/IP stack.

In alternative embodiments, SAM 200 incorporates into other devices including a network interface card, an FPGA, an ASIC, hardware modules, or other components. When SAM 200 is implemented as a hardware module it is contemplated network interface 240 and interfaces associated with host interface 230 comprise physical interfaces including standardized busses or programmable I/O pins. Examples of standardized busses include PCI, or PCI express. In addition, it is contemplated that storage devices incorporate SAM 200. For example, it is specifically contemplated that hard disk drives or chassis capable of housing a plurality of hard disk drives benefit from employing SAM 200 to accelerate processing storage protocols. Especially contemplated devices that employ SAM 200 include personal video recorders, digital video recorders, gaming consoles, video editing equipment, A/V equipment, music players, computers, or other electronic products that use data storage.

Contexts

Figure 3:
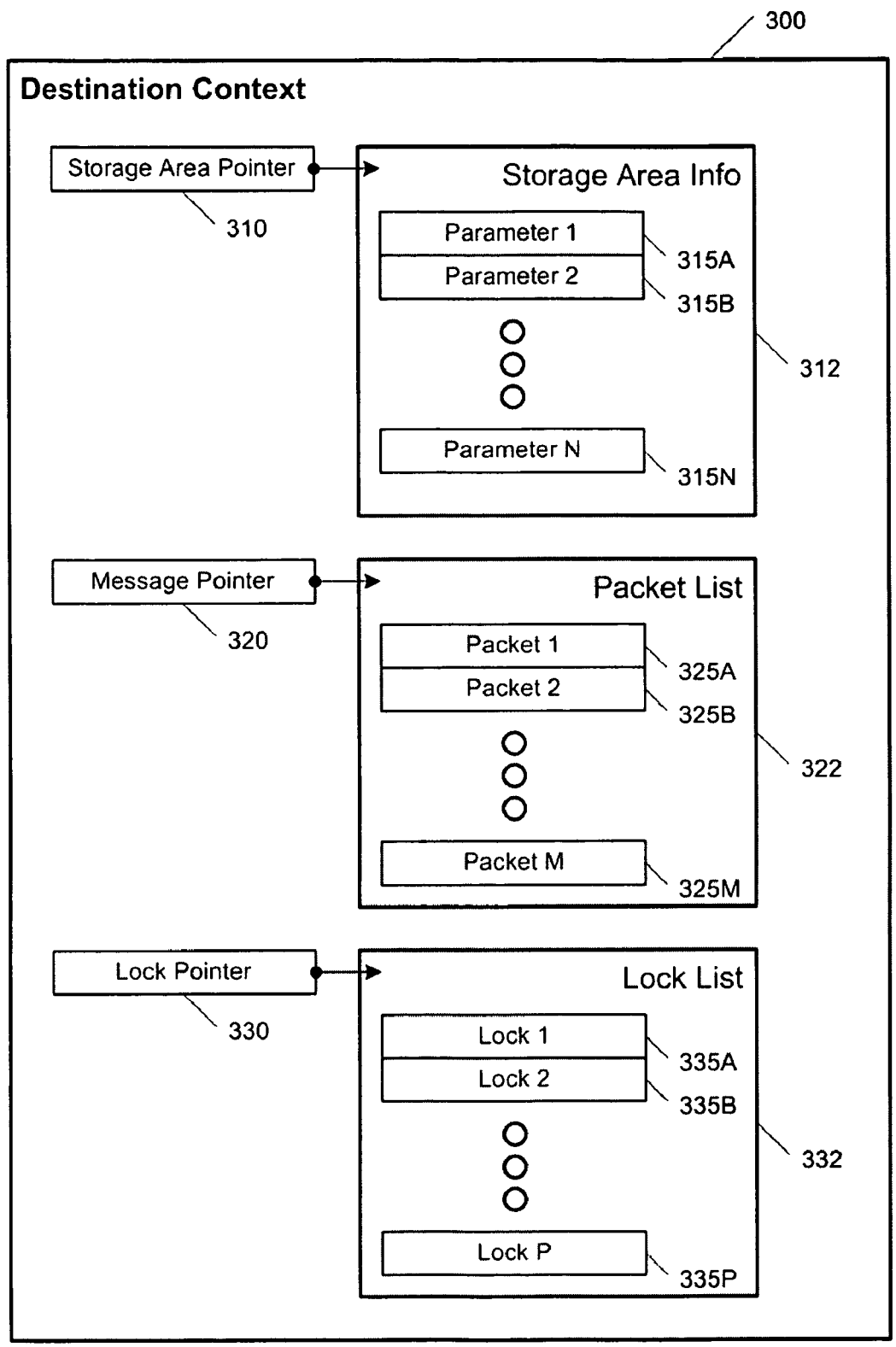
FIG. 3 depicts a logical representation of a context stored in a memory.

FIG. 3 represents a possible embodiment of a destination context that can be used by a SAM. Destination context 300 comprises information regarding a final destination end-point for a storage protocol message. In a preferred embodiment destination context 300 comprises at least storage area pointer 310 that points to storage area information 312. Destination context 300 can also include message pointer 320 or lock pointer 330. Message pointer 320 pointes to packet list 322 that comprise a list of one or more packets 325A through 325M that combine to form a single storage protocol message. Lock pointer 330 points to a list of one or more locks 335A through 335P.

In a preferred embodiment, destination context 300 includes information associated with a single end-point of a communications link as represented by storage area information 312 comprising parameters 315A through 315N. For example, if the destination of a packet is a storage area that has an IP address, the destination context for the storage area could comprise parameters including the storage area's IP address, storage area size, authentication information, starting LBA on a hard disk drive, LBA mapping information, or other storage area parameters. As a SAM receives packets, it checks for a destination context based on the packet's intended destination, preferably using the destination address of the packet. When UDP/IP is used to transport a storage protocol message via datagrams that are packetized, the SAM identifies the storage area by destination address and stores the IP address and port of the source in case a response to the message is necessary.

In a preferred embodiment, a SAM collects packets 325A through 325M that belong to a single storage protocol message. Once the message is complete, the SAM passes message pointer 320 to an application without having to copy payload information. The message can be processed immediately without passing through a network layer or a transport layer. Furthermore, through using context information regarding the end-point, a SAM has greater control over the priority of passing messages to the application in preference over non-storage related packets than would exist without a SAM.

Lock list 332 are used in the preferred embodiment to handle data locks on storage areas or file locks in conjunction with a file system. Each storage area has its own list of locks 335A through 335P.

Destination context 300 not only includes end-point information for a network communication link, but also application level information to facilitate high speed processing of packets. In an example where a SAM is employed on a network storage server, if no context exists for a storage protocol message, the message can be discarded without further processing. In addition, if a storage protocol message arrives and requests information regarding a storage area, the SAM is able to respond immediately with the requested information without passing the message to the application assuming the SAM participates in the storage protocol as some level. If a SAM encounters a non-storage protocol related packet, it can pass it back to the stack for processing. The filtering or bypassing functionality of a SAM is substantially governed by the destination context 300 and the ability to find destination context 300 quickly.

In alternative embodiments destination context 300 could include functions or pointers to functions that operate on different packets in different manners. This allows an application to tailor the behavior of a SAM to fit its needs more appropriately.

Context Look-Up

Figure 4:
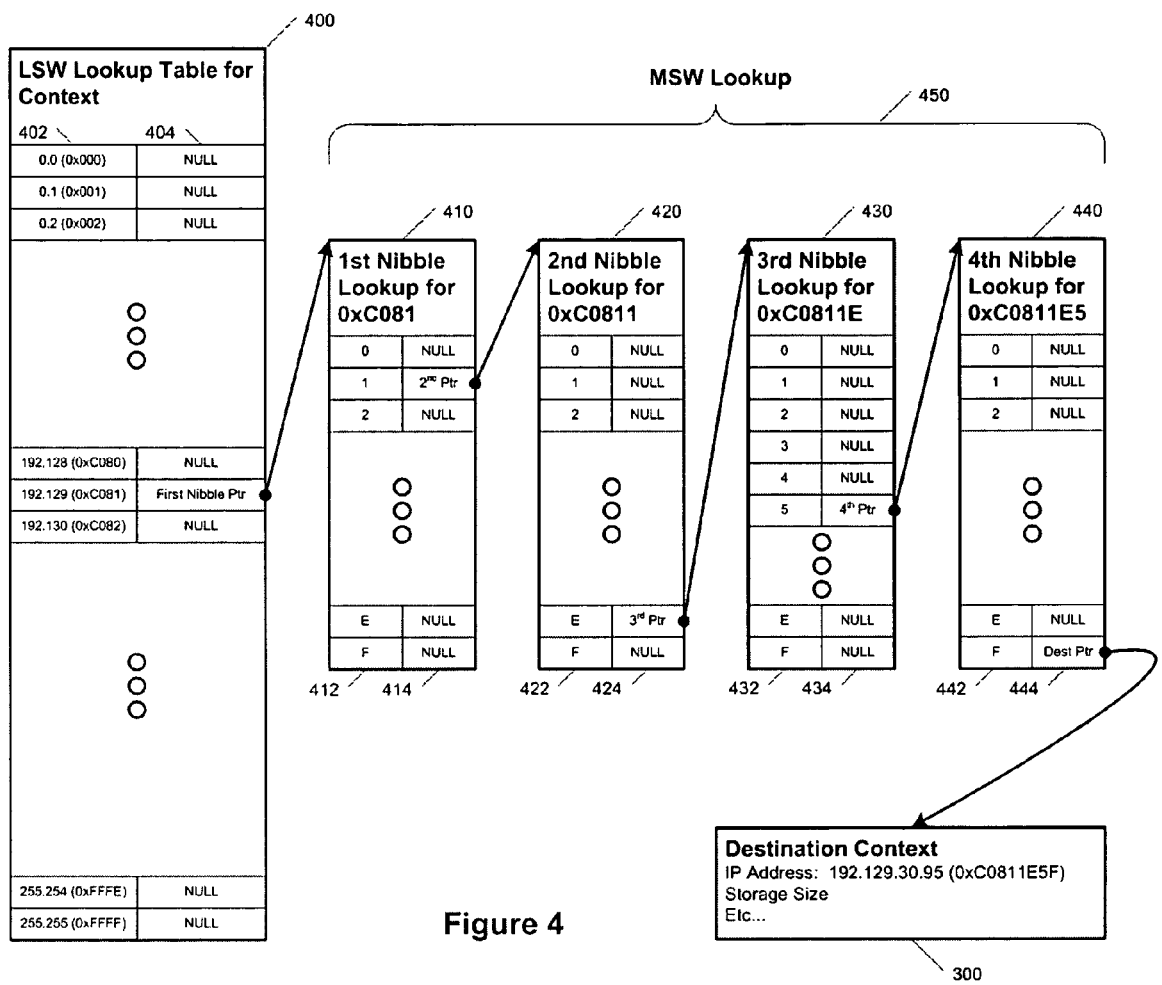
FIG. 4 illustrates a possible look-up table used to find a context.

FIG. 4 represents a possible look-up table a SAM could employ to find a destination context.

One of a SAM's responsibilities includes processing incoming packets as fast as possible by filtering the packets given the constraints or performance of a processing unit or of available memory. In a preferred embodiment, a storage network server could support 1000's of addressable storage areas each with their own context. In the case where each storage area has an address, each address could belong to a different sub-net depending on the role each storage area fulfills. The complexity of the storage area address space becomes quite high when a storage server is behind a NAT router or where the server could store addresses from an entire class C, class B, or class A network, or a classless network based on CIDR subnet masks. Therefore, a SAM uses a fast look-up method to find destination context 300 while maintaining constraints on memory.

In a preferred embodiment, when a SAM receives a storage protocol message or packets comprising a storage protocol message, the SAM checks for the destination of the message or packet. A destination includes an address, preferably an IP address or other address that can be represented in a binary fashion. The SAM checks the least significant word (LSW) of the address and consults look-up table 400. Look-up table 400 comprises a table of pointers represented by column 404 indexed by the values in column 402. In the example shown, there is an entry in the table for each of the possible 65536 entries for the 16-bit LSW of an IP address. For example, if a storage protocol message references IP address 192.128.5.32, the SAM checks the entry corresponding to the 16-bits representing "192.128" having a hex value of 0xC080 which has a NULL entry. In most cases, column 404 will have NULL pointers indicating there is no destination context. However, in cases where there is an entry, the pointer in column 404 for the entry points to a smaller look-up table that only exists when there is a target destination context. The most significant word (MSW) look-up 450 comprises using tables 410, 420, 430, and 440. Each of these tables represents a look-up for a nibbles worth of an address where each table has indices as represented by columns 412, 422, 432, and 442 respectively and pointer entries in columns 414, 424, 434, and 444, respectively.

As an example, consider the example shown in FIG. 4 where a SAM receives a packet with a destination address of 192.129.30.95. First the SAM finds the index based on the 16-bits represented by "192.129" (a value of 0xC081) for look-up table 400. The SAM finds a pointer to table 410 which comprises indices in column 412 and entries in column 414. The next nibble of the address is 0x1 ("30" in hex is 0x1E). Entry 0x1 comprises a pointer to table 420 which comprises indices in column 422 and entries in column 424. The next nibble in of the address is 0xE, whose entry in table 420 has a pointer to table 430. The next nibble of the address is 0x5 ("95" in hex is 0x5F). The 0x5 entry in table 430 points to table 440. The 0xF entry table 440 points to destination context 300.

Assuming a 32-bit pointer value, look-up table 400 consumes 256 KB of memory. Each subsequent table consumes 64 bytes of memory. For small network storage servers where devices are cost sensitive and require performance, the look-up tables 400, 410, 420, 430, and 440 offer very fast filtering performance of packets at some expense in memory. In larger enterprise systems, it is contemplated greater performance is required so the tables can be modified for greater speed. For systems that have severe memory constraints, contemplated restrictions on look-up table 400 included representing only a sub-net rather then an entire address range. For example, table 400 could include only entries for non-routable IP addresses similar to "192.128.xxx.yyy" which could reduce the need for addition look-up tables. Additionally, applying restrictions to look-up table 400 includes obtaining information from routers, DHCP servers, or other networking equipment then constructing the table to optimize memory usage or performance in looking up addresses.

All look-up tables that use a portion of the address and an index are contemplated. If an address has Y bits, then it is contemplated that a look-up table can employ X bits of the Y bits. In cases where X is less than Y, specifically contemplated pairs of (X, Y) include (4, 32), (8, 32), (16, 32), (24, 32), (4, 128), (8, 128), (16, 128), (24, 128), (32, 128), or (64, 128). These configurations include support for 32-bit IPv4 addresses or 128-bit IPv6 addresses. The preferred embodiment employs IP addresses as addresses for storage areas; however, it is contemplated that other addresses could also apply, for example, 48 or 64-bit MAC addresses could be used to represent a storage area or a 16-bit UDP or TCP port assignment could used to represent a storage area. It is also contemplated that an alternative embodiment could index table 400 based on other bit fields other than the address of a packet, look-up table 400 could use any bit field rather than just an address. Bit fields extracted from packet headers or from the payload of a packet could form indices to the lookup table. For example, if a SAM could index a table by using parts of the IP address, the port assigned, and a storage protocol command combined together. A knowledgeable reader will recognize the strong similarities between the presented scheme and those employed by high-end routers. Therefore, it is contemplated that high-end router address look-up algorithms fall within the scope of the inventive subject matter. Especially preferred algorithms or variants include multibit tries, recursive flow classification, PATRICIA, BSD tries, or other known or yet to be inventive router address look-up algorithms.

One ordinarily skilled in the art of software or firmware development will appreciate alternative look-up strategies exist for finding destination contexts. Each strategy has advantages and disadvantages. An alternative embodiment includes using a hash table to find a destination context.

Accelerating Packet Processing

A SAM has a number of responsibilities. A primary responsibility is to eliminate unnecessary packets or to present storage protocol messages to an application quickly by passing packets through a filter function. Additional responsibilities include forming a storage protocol message from packets, filtering unnecessary packets, protecting an application from denial of service attacks, bypassing portions of a communication stack, passing packets to the communication stack, or other operations that similarly accelerate the processing of stateless protocols.

Figure 5:
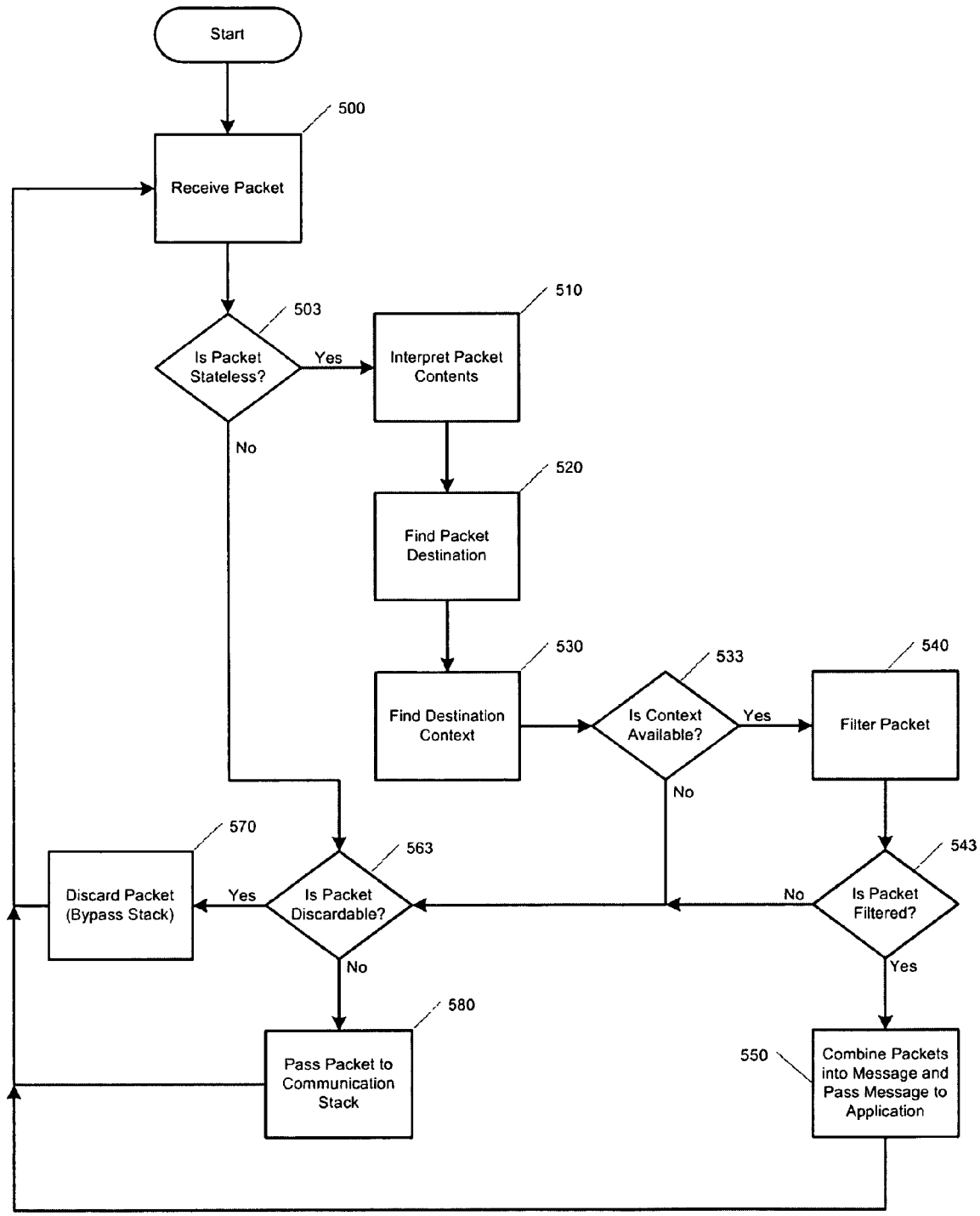
FIG. 5 represents a series of possible steps to accelerate packet processing.

FIG. 5 represents a possible series of steps employed by a preferred SAM to fulfill its responsibilities of accelerating packet processing by passing packets through a filter function. The steps in FIG. 5 represent a preferred embodiment where a SAM accelerates the processing of received packets from the network and presents storage protocol messages to an application through the steps presented below. It is also contemplated a SAM can advantageously accelerate the transmit operations by similarly bypassing portions of a communication stack. In addition, no limitations are implied by the following steps. One ordinarily skilled in the art of networking will recognized alternative embodiments are possible, all of which fall within the scope of the inventive subject matter.

At step 500 the SAM receives a packet from a network interface. In a preferred embodiment, packets are passed from a packet switched network through a physical layer, to a link layer, to the SAM which interfaces directly to the link layer of a communication stack. Contemplated physical layers include either wired or wireless media. Examples of wired media include Ethernet running at 10 Mbit, 100 Mbit, 1000 Mbit, or 10 Gbit per second. As the speed of the physical layer infrastructure increases, the need for a SAM increases. Examples of wireless media include 802.11a/b/g, WiMAX, or other forms of wireless communication.

Once the SAM receives a packet from the link layer, the SAM determines if the packet is a member of a stateless protocol at step at 503. In one possible embodiment, the SAM checks the transport header of the packet to see if the stateless protocol is UDP. In an alternative embodiment, it is contemplated the stateless protocol is carried over a stateful protocol. For example, HTTP is a stateless protocol carried over TCP. Under these circumstances, the SAM checks the payload of the packet for the stateless protocol. Contemplated checks for the stateless protocol include checking port assignments of the transport layer, checking protocol assignment in the IPv4 header, checking subsequent next header fields in IPv6 packets, checking payload contents, or checking for storage protocol message information. If the packet comprises stateless protocol information that the SAM should process, it is passed to step 510 where the SAM's analysis begins. If the packet does not comprise stateless protocol information, the packet is passed to step 563.

At step 563, the SAM determines if the packet should be discarded without further processing by the SAM or by the communication stack. Packets are discarded if they are considered useless for the system of which the SAM is a part. In some hostile networking environments, denial of service (DoS) attacks occur causing the system to consumer computing resources handling useless incoming packets rather than handling storage protocol messages. Therefore, the SAM is contemplated to include information relating to other valid destinations beyond those relevant to the storage protocol. For example, a rack-mount chassis for a disk array could include a web server for management. Under these circumstances, the SAM would allow TCP traffic on port 80 to pass to the communication stack for further processing. If the chassis had no other servers or clients running other than the storage application and the web server, the SAM would discard the packets. Therefore it is contemplated that a SAM comprises firewall capabilities. If the SAM determines if the packet should be discarded, then the packet is silently discarded at step 570. If the SAM determines if the packet should continue up the stack for processing, then the SAM passes the packet up to the network layer of the communication stack at step 580. After the SAM determines if the packet should be discarded or not, the SAM returns back to step 500 to process the next packet.

If the SAM has determined the packet comprises a stateless protocol of interest or comprise the storage protocol, then at step 510 the SAM begins analyzing the packet further. At step 510, the SAM interprets the contents of the packet to find relevant information regarding the storage protocol. The relevant information includes the destination for the packet, preferably in the form of a destination address, datagram fragment information in the case where a storage protocol message has been fragmented into a number of packets, or other information relevant to the destination of the packet. Preferably, at step 520, the SAM finds the destination of the packet based on the packets destination IP address; however, alternative destinations could include a destination port assignment, an address in the packet payload, a name within the packet, or other information that the SAM can interpret as the final storage area destination.

At step 530 the SAM finds the destination context based on the destination of the packet. The concept of the SAM comprises the idea of accelerating the processing of storage protocol message; therefore, the step of finding the destination context of the packet is preferably fast. In a preferred embodiment the SAM employs a fast look-up table where portions of the destination address are used as an index into look-up tables as described previously. Those skilled in the art will appreciate alternative forms for fast destination context look-ups exist, all of which fall within the scope of the presented subject matter.

At step 533, the SAM checks if the destination context exists. If no context exists, then the application has no storage area associated with the packet and the SAM returns to step 563 to decide if the packet should be discarded. In a preferred embodiment, packets could comprise storage protocol messages that create new storage areas; therefore, the SAM is sensitive to the concept that even though no destination context yet exists, the processing of the storage protocol message could result in valid destination context. If a destination context does exist or will exist, the SAM further analyzes the packet at step 540.

At step 540 the SAM utilizes information from the destination context to filter the packet. For example, if the storage area is an IP addressable partition and is a member of a multicast group composing a logical volume of storage, the SAM could filter the packet based on logical block address (LBA) information. If the packet comprises an LBA identifying a data block on a storage area, but the destination context indicates that the storage area is not responsible for the LBA, then the packet would be filtered. In a preferred embodiment the SAM filters packets as a function of information within the destination context including LBAs, LBA ranges, authentication information, or additional destination information. If the packet is not filtered at step 543, then the SAM decides if the packet should be discarded at step 563.

If a packet passes the filter, then at step 550 the SAM either aggregates the packet with previous or subsequent packets to form a storage protocol message or passes the packet on to the application if it comprises a complete storage protocol message. If the packet completes a message, then a pointer to the completed message is passed to the application for processing. By passing a pointer to the message, the SAM effectively provides a zero-copy data transfer to the application. Furthermore, once the application has the pointer, the data can be directly be placed into the storage device, thereby effectively creating a zero-copy data transfer to the storage device, possibly using DMA depending on the type of storage device. In a preferred embodiment, the complete message comprises an atomic command that the application can process with out additional information. Once the message has been passed to the application, the SAM proceeds back to step 500 to continue processing incoming packets.

In a preferred embodiment the SAM processes packets at substantially line rates, wherein "substantially at line rates" means up to 70% of the rated capacity of the line. In especially preferred embodiments, the SAM will process packets substantially at line rate where packets have sizes including sizes of less than 17000 bytes, less than 1600 bytes, or less than 100 bytes. Packet sizes depend on the networking infrastructure and the nature of the communication. DoS packets could be 88 bytes or smaller. 10 Gbit Ethernet infrastructure supports packets having sizes larger than 16,000 bytes.

In one possible embodiment of the SAM, the steps illustrated in FIG. 5 are encoded into a series of instructions stored in a computer readable media. The instructions are executable by a processing unit. The instructions are advantageously employed on network storage servers and are also advantageously employed on clients systems that access network storage servers. In an alternative embodiment the steps illustrated in FIG. 5 are encoded in hardware including an ASIC or a programmable gate array.

Advantages

SAMs introduce several advantages to the network storage industry. Costs are reduced because SAMs implemented in software or firmware reduces the compute bound nature of packet processing associated with communication stacks. In addition, by filtering packets or by bypassing the communication stack, a storage application can utilize less expensive processing units. Reducing the cost of a network storage device while improving performance creates opportunities within consumer markets for network storage where none had previously existed.

Performance is a key factor for high-end markets. SAMs enable processing of packets substantially at line rates even for high-end networking infrastructure including 1000 Mbit or 10 Gbit rates. It is contemplated that SAMs implemented in hardware greatly facilitate performance for high-end systems where the market is less sensitive to costs, but requires performance.

SAMs also provide systems for protection against hostile environments. When network traffic floods a system, the SAM processes and filters the traffic quickly and efficiently allowing application level messages to pass thought the filter function.

As the network storage industry migrates from stateful protocols to stateless protocols, SAMs open opportunities for companies producing TOEs. Such companies are able to bring to bear their core competencies to stateless accelerator modules.

Software

In still another aspect, it is contemplated that one could write software that would configure, simulate, or manage SAMs and their associated infrastructure. From that perspective the inventive subject matter includes methods of writing such software, recording the software on a machine readable form, licensing, selling, distributing, installing, or operating such software on suitable hardware. Moreover, the software per se is deemed to fall within the scope of the inventive subject matter.

Thus, specific compositions and methods of stateless accelerator modules have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method comprising:
    receiving a packet, which includes an address of a storage area, through a network interface;
    finding information associated with the storage area, wherein the information is stored in a memory and said finding is based at least in part on the address;
    filtering the packet as a function of the information; and
    providing a storage protocol message, which includes at least a portion of the packet, to an application by bypassing at least a portion of a communication stack based at least in part on the filtering of the packet.

2. The method of claim 1, wherein the address comprises an internet protocol address.

3. The method of claim 1, wherein said finding the information includes employing a look-up table based at least in part on the address.

4. The method of claim 1, wherein said finding the information includes employing a hash table.

5. The method of claim 1, further comprising processing the packet at substantially line rate of the network interface.

6. The method of claim 1, wherein said providing the storage protocol message to the application comprises providing a zero copy data transfer of the storage protocol message to the application.

7. The method of claim 6, wherein the zero copy data transfer comprises a transfer to a storage device.

8. A computer readable memory storing instructions that instruct a processing unit to execute the method in claim 1.

9. The method of claim 1, wherein the packet includes an address of the destination and said finding the information comprises:
    accessing a pointer stored in a least significant word (LSW) lookup table based at least in part on a LSW of the address.

10. The method of claim 9, wherein the pointer is a first pointer that points to a most significant word (MSW) lookup table and said finding further comprises:
    accessing a second pointer stored in the MSW lookup table based at least in part on a nibble of a MSW of the address.

11. The method of claim 1, wherein the packet is a first packet, the information is first information, the address is a first address, and the destination is a first destination, the method further comprising:
    receiving a second packet of the stateless protocol, the second packet having a second address of a second destination;
    finding second information associated with the second destination, the second information having parameters of the second destination; and
    discarding the second packet based at least in part on the parameters of the second destination.

12. The method of claim 1, wherein the packet is a stateless protocol packet.

13. An apparatus comprising:
    an application; and
    an accelerator module to be coupled with the application and configured to receive a packet transmitted over a network, the packet having an address of a storage location;
    to access a destination context associated with the storage location based at least in part on the address; and
    to pass at least a portion of the packet to the application by bypassing at least a portion of a communication stack of the apparatus based at least in part on the destination context.

14. The apparatus of claim 13, wherein the destination context is localized to only the storage location.

15. The apparatus of claim 13, wherein the destination context includes a size of the storage location.

16. The apparatus of claim 13, wherein the destination context includes a starting logical block address of the storage location.

17. The apparatus of claim 13, wherein the destination context includes a message pointer to point to a packet list of one or more packets that are associated with a single storage protocol message.

18. The apparatus of claim 13, wherein the accelerator module is configured to access the destination context by being configured to:
 access a pointer stored in a least significant word (LSW) lookup table based at least in part on a LSW of the address of the storage location.

19. The apparatus of claim 18, wherein the pointer is a first pointer that points to a most significant word (MSW) lookup table and the accelerator module is further configured to access the destination context by being configured to:
 access a second pointer stored in the MSW lookup table based at least in part on a nibble of a MSW of the address of the storage location.

20. The apparatus of claim 13, wherein the packet is combined with one or more other packets to form a storage protocol message and the accelerator module is configured to pass the packet to the application by being configured to pass a pointer to the storage protocol message to the application.

21. The apparatus of claim 13, wherein the accelerator module is further configured to:
 receive another packet transmitted over the network in accordance with a stateless transmission protocol, the packet having an another address of another storage location;
 to access another destination context associated with the another storage location, the another destination context having parameters of the another storage location; and
 to discard the another packet based at least in part on the parameters of the another storage location.

22. The apparatus of claim 13, wherein the packet is transmitted over the network in accordance with a stateless transmission protocol.

23. An apparatus comprising:
 an application;
 a communication stack; and
 an accelerator module configured to be coupled to the application and the communication stack, and to
  receive a first packet and a second packet that respectively include a first address and a second address;
  use the first address to access a first destination context that includes parameters of a first destination of the first packet;
  provide a storage protocol message to the application, bypassing at least a portion of the communication stack, based on the first packet and the first destination context;
  use the second address to access a second destination context that includes parameters of a second destination of the second packet; and
  discard the second packet based on the parameters of the second destination.

24. The apparatus of claim 23, wherein the first destination is a storage area and the parameters of the first destination comprise storage area information including a size of the storage area and a starting logical block address of the storage area.

25. The apparatus of claim 23, wherein the first address comprises an internet protocol address.

26. The apparatus of claim 23, wherein the accelerator module comprises a first interface to interface with a lower portion of the communication stack, a second interface to interface with an upper portion of the communication stack, and a third interface to interface with the application.

27. The apparatus of claim 23, wherein the accelerator module further comprises a security module.

28. The apparatus of claim 23, wherein the accelerator module comprises a host interface with at least one of the following a bus, PIO lines, an API, and an inter-process communication.

29. The apparatus of claim 23, wherein the accelerator module is configured to use the first address to access the first destination context by being configured to:
 access a pointer stored in a least significant word (LSW) lookup table based at least in part on a LSW of the first address.

30. The apparatus of claim 29, wherein the pointer is a first pointer that points to a most significant word (MSW) lookup table and the accelerator module is further configured to use the first address to access the first destination context by being configured to:
 access a second pointer stored in the MSW lookup table based at least in part on a nibble of a MSW of the first address.

31. The apparatus of claim 23, wherein the first packet and the second packet to be received are of a stateless protocol.

32. The apparatus of claim 31, wherein the stateless protocol comprises an internetworking protocol.

33. The apparatus of claim 32, wherein the stateless protocol includes at least one of the following protocols IPv4, IPv6, UDP, and HTTP.

* * * * *